US009934694B2

(12) United States Patent
Navot et al.

(10) Patent No.: US 9,934,694 B2
(45) Date of Patent: Apr. 3, 2018

(54) GROUND EFFECT BASED SURFACE SENSING USING MULTIPLE PROPELLERS IN AUTOMATED AERIAL VEHICLES

(71) Applicant: Amazon Technologies, Inc., Seattle, WA (US)

(72) Inventors: Amir Navot, Seattle, WA (US); Brian C. Beckman, Newcastle, WA (US); Daniel Buchmueller, Seattle, WA (US); Gur Kimchi, Bellevue, WA (US); Fabian Hensel, Seattle, WA (US); Scott A. Green, North Bend, WA (US); Brandon William Porter, Yarrow Point, WA (US); Severan Sylvain Jean-Michel Rault, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/606,807

(22) Filed: May 26, 2017

(65) Prior Publication Data

US 2017/0263136 A1 Sep. 14, 2017

Related U.S. Application Data

(63) Continuation of application No. 14/315,952, filed on Jun. 26, 2014.

(51) Int. Cl.
*B64D 45/04* (2006.01)
*G05D 1/00* (2006.01)
(Continued)

(52) U.S. Cl.
CPC ......... *G08G 5/0086* (2013.01); *B64C 39/024* (2013.01); *B64D 45/04* (2013.01);
(Continued)

(58) Field of Classification Search
CPC ................ G08G 5/0086; B64C 39/024; B64C 2201/141; B64C 2201/108; B64D 45/04; G05D 1/0088; G05C 5/0808
See application file for complete search history.

(56) References Cited

U.S. PATENT DOCUMENTS 3,743,221 A 7/1973 Lykken et al.
5,186,415 A 2/1993 Li
(Continued)

FOREIGN PATENT DOCUMENTS

EP 2386925 A1 11/2011
JP 2006082775 A 3/2006
(Continued)

OTHER PUBLICATIONS

International Search Report for PCT Application No. PCT/US2015/037286 dated Sep. 22, 2015.
(Continued)

*Primary Examiner* — Anne M Antonucci
(74) *Attorney, Agent, or Firm* — Athorus, PLLC

(57) ABSTRACT

A system and method for operating an automated aerial vehicle are provided wherein influences of ground effects (e.g., which may increase the effective thrusts of propellers by interfering with the respective airflows) are utilized for sensing the ground or other surfaces. In various implementations, operating parameters of the automated aerial vehicle are monitored to determine when ground effects are influencing the parameters associated with each of the propellers, which correspondingly indicate proximities to a surface (e.g., the ground). Utilizing such techniques, different propellers of an automated aerial vehicle may provide different sensing data (e.g., for detecting issues with an uneven
(Continued)

200
222-4 204-3 222-3 222-2 222-1
220-2
220-4 204-4 204-1 220-1
204-2
220-3 100 290 landing area, a sloped ground, determining an automated aerial vehicle's location based on a unique ground surface profile, etc.)

20 Claims, 9 Drawing Sheets

(51) Int. Cl.

| | |
|---|---|
| ***G05D 1/06*** | (2006.01) |
| ***G08G 5/00*** | (2006.01) |
| ***G05D 1/08*** | (2006.01) |
| ***B64C 39/02*** | (2006.01) |
| ***G07C 5/08*** | (2006.01) |

(52) U.S. Cl.
CPC ......... *G05D 1/0088* (2013.01); *G05D 1/0676* (2013.01); *G05D 1/0858* (2013.01); *G07C 5/0808* (2013.01); *B64C 2201/108* (2013.01); *B64C 2201/141* (2013.01)

(56) References Cited

U.S. PATENT DOCUMENTS

| | | | |
|---|---|---|---|
| 6,260,796 | B1 | 7/2001 | Klingensmith |
| 7,095,364 | B1 | 8/2006 | Rawdon et al. |
| 9,317,040 | B1 | 4/2016 | Hilde |
| 2010/0012776 | A1 | 1/2010 | Hursig et al. |
| 2011/0049290 | A1 | 3/2011 | Seydoux et al. |
| 2011/0264314 | A1 | 10/2011 | Parras |
| 2012/0173053 | A1 | 7/2012 | Ohtomo et al. |
| 2013/0325217 | A1 | 12/2013 | Seydoux et al. |

FOREIGN PATENT DOCUMENTS

| | | | |
|---|---|---|---|
| JP | 2008290704 | A | 12/2008 |
| JP | 2011511736 | A | 4/2011 |
| JP | 2011230756 | A | 11/2011 |
| JP | 2012140101 | A | 7/2012 |
| JP | 2013212832 | A | 10/2013 |

OTHER PUBLICATIONS

Japanese Office Action for corresponding JP Application No. 2016-571089 dated Oct. 30, 2017, 8 pages.

GROUND EFFECT BASED SURFACE SENSING USING MULTIPLE PROPELLERS IN AUTOMATED AERIAL VEHICLES

PRIORITY CLAIM

This application is a continuation of U.S. application Ser. No. 14/315,952, filed Jun. 26, 2014, entitled "Ground Effect Based Surface Sensing In Automated Aerial Vehicles," which is incorporated by reference herein in its entirety.

BACKGROUND

Automated aerial vehicles are continuing to increase in use. For example, automated aerial vehicles are often used for surveillance. While there are many beneficial uses of automated aerial vehicles, they also have many drawbacks. For example, automated aerial vehicles may sustain or cause damage if they collide with the ground or other surfaces. In order to avoid such collisions, various types of sensors may be utilized. However certain types of sensors may fail or otherwise become inoperable or inaccurate due to various factors. For example, some sensors may be inhibited by various atmospheric or weather conditions, such as rain, snow, fog, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
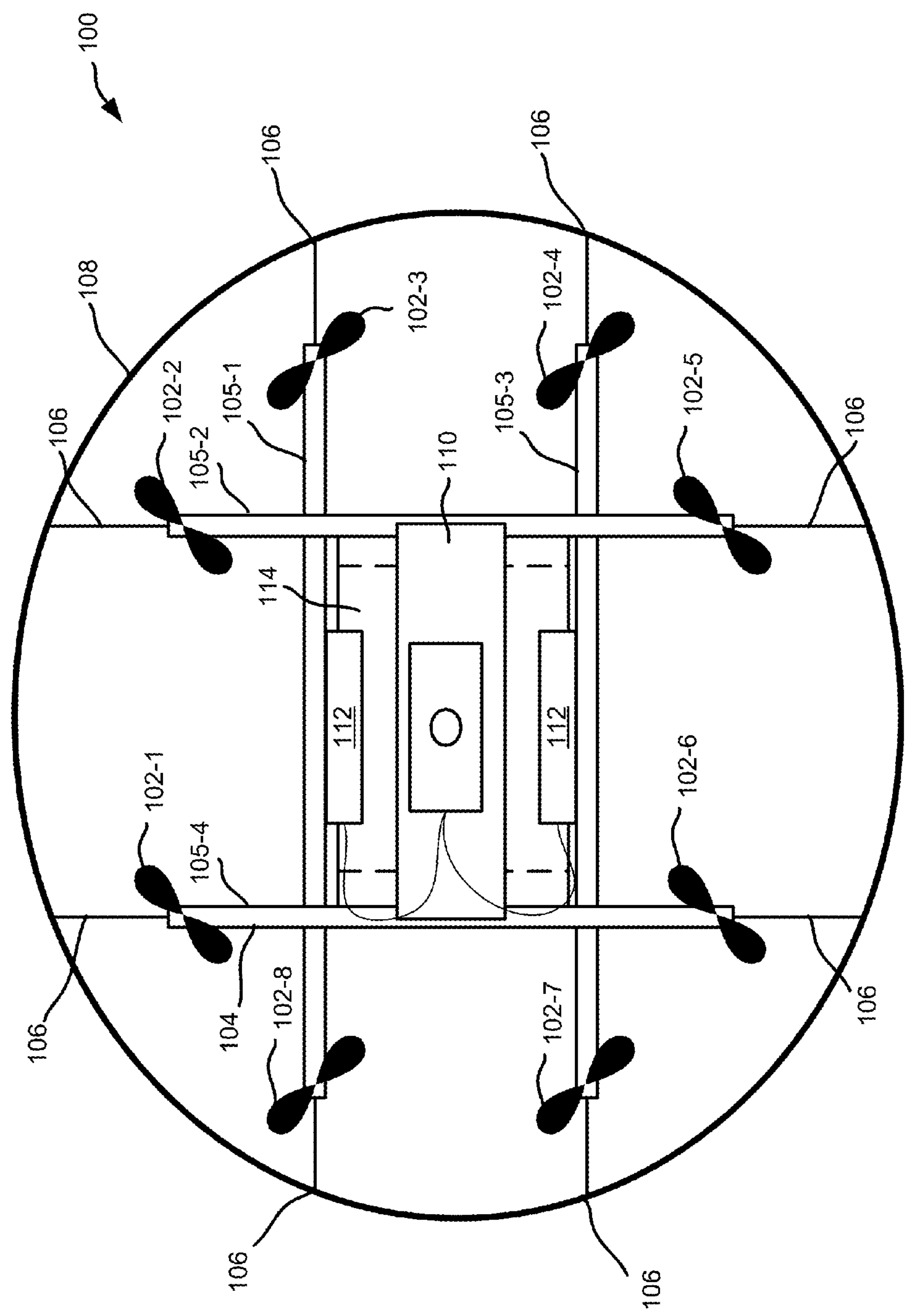
FIG. 1 depicts a block diagram of a top-down view of an automated aerial vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an automated aerial vehicle ("AAV") and system in which influences of a ground effect may be utilized for sensing the ground or other surfaces. A ground effect occurs when an AAV is close enough to a surface (e.g., the ground) such that the airflow that is created by one or more of the propellers of the AAV is directed against the surface (i.e., the surface is close enough to be in the way of the airflow and thereby increase the effective thrust that is created). Various aspects of the airflow from the propellers may sometimes be referred to as the "propwash" or "slipstream" that is created by the propellers. As a result of the ground effect, less power may be required (e.g., due to a reduced velocity of the airflow as it pushes against the surface) for rotating the propellers to hover the AAV at a given distance from the surface. For example, when an AAV is hovering close to the ground, the amount of power required to maintain the hover at the given height may be reduced as compared to the amount of power required to hover at a higher elevation away from the ground. When an autopilot or an effective thrust feedback system is utilized for flying the AAV and a ground effect is encountered, the power supplied to the propeller motors may automatically be reduced in order to maintain the AAV at a given elevation and/or effective thrust. As will be described in more detail below, these types of changes that are influenced by the ground effect may be utilized as part of a system and method for sensing the ground or other surfaces.

In various implementations, a parameter of an AAV may be monitored to determine when a ground effect is influencing the parameter. For example, the parameter that is monitored may include a voltage, current or power supplied to one or more of the propeller motors, a speed of a propeller motor or associated propeller, an effective thrust of a propeller, a speed of the airflow of a propeller, etc. As described above, all of these types of parameters may be influenced by a ground effect. Based on a level of the parameter that is monitored, a determination may be made as to whether a ground effect is influencing the parameter which may indicate a corresponding proximity of the AAV to a surface.

In various implementations, the determination of the proximity of the AAV to the surface may be made based on equations and/or experimental data. For example, based on a knowledge of how a ground effect influences airflow from a propeller, various equations may be utilized for calculating a specified parameter level when an AAV is flying close to a surface. Alternatively, experimental data may be recorded and utilized to indicate a correspondence between a given parameter level and a distance of the AAV from a surface. In either case, as the parameter is monitored, a percentage change in the parameter may also be utilized for determining whether the AAV has moved proximate to a surface.

In various implementations, an AAV may also include one or more additional sensor systems that are utilized for determining distances to surfaces. For example, in one implementation, the above described ground effect techniques may be implemented as a backup for a primary sensor system. In various implementations, the primary sensor system may operate based on technologies such as imaging, sonar, radar, lidar, infrared, laser, etc. In the event that the primary sensor system fails or is inhibited by certain conditions, the backup system utilizing ground effect techniques can help ensure the continuing safe operation of the AAV. For example, various types of sensor systems may be inhibited by rain, snow, fog, reflections, bright sunlight, etc. If the ground effect techniques indicate a proximity to a surface that the primary sensor system does not recognize, this may indicate a problem with the primary sensor system, in which case various types of actions may be taken. For example, as a safety precaution, the AAV may initially be moved in a direction away from the indicated surface, so as to avoid the possibility of a collision. In addition, the primary sensor system may be checked to ensure that it is operating properly. If the primary sensor system is determined to not be operating properly, various additional safety precautions may be taken. For example, the AAV may continue to be flown toward its destination, although at a higher elevation, as an additional safety margin given that the primary sensor system is not operating properly. As another example, the AAV may be landed as soon as possible so that it may be serviced for addressing any problems with the primary sensor system.

During a landing process, or when an AAV is following a flight path that is near to the ground, certain parameters may be expected to be influenced by ground effects. As an example, if a landing location is expected to be flat and even, it may be expected that parameters associated with propellers at the front and rear of the AAV will have similar changes to their levels as influenced by ground effects as the AAV descends. However, if the changes to the levels that occur corresponding to the front and rear of the AAV during landing are not similar, this may indicate an uneven surface (e.g., with a significant slope, step height, edge, etc.), which could cause the AAV to slide, roll over, fall, etc., in a way that could be damaging. In such a case, a new landing location may be selected.

While the examples discussed herein primarily focus on AAVs in the form of an aerial vehicle utilizing multiple propellers to achieve flight (e.g., a quad-copter or octo-copter), it will be appreciated that the implementations discussed herein may be used with other forms of AAVs. A "relay location," as used herein, may include, but is not limited to, a delivery location, a materials handling facility, a cellular tower, a rooftop of a building, a delivery location, or any other location where an AAV can land, charge, retrieve inventory, replace batteries and/or receive service.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items may be delivered. For example, the delivery location may be a person's residence, a place of business, a location within a materials handling facility (e.g., packing station, inventory storage), any location where a user or inventory is located, etc. Inventory or items may be any physical goods that can be transported using an AAV.

FIG. 1 illustrates a block diagram of a top-down view of an AAV 100, according to an implementation. As illustrated, the AAV 100 includes eight propellers 102-1, 102-2, 102-3, 102-4, 102-5, 102-6, 102-7, 102-8 spaced about the frame 104 of the AAV. The propellers 102 may be any form of propeller (e.g., graphite, carbon fiber) and of a size sufficient to lift the AAV 100 and any inventory engaged by the AAV 100 so that the AAV 100 can navigate through the air, for example, to deliver an inventory item to a location. While this example includes eight propellers, in other implementations, more or fewer propellers may be utilized. Likewise, in some implementations, the propellers may be positioned at different locations on the AAV 100. In addition, alternative methods of propulsion may be utilized. For example, fans, jets, turbojets, turbo fans, jet engines, and the like may be used to propel the AAV in combination with or independently of various propeller systems, and to which the ground effect based sensing techniques described herein may also apply.

The frame 104 or body of the AAV 100 may likewise be of any suitable material, such as graphite, carbon fiber and/or aluminum. In this example, the frame 104 of the AAV 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length while, in other implementations, some or all of the rigid members may be of different lengths. Likewise, the spacing between the two sets of rigid members may be approximately the same or different.

While the implementation illustrated in FIG. 1 includes four rigid members 105 that are joined to form the frame 104, in other implementations, there may be fewer or more components to the frame 104. For example, rather than four rigid members, in other implementations, the frame 104 of the AAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. As discussed further below, a cavity within the frame 104 may be configured to include an inventory engagement mechanism for the engagement, transport and delivery of item(s) and/or containers that contain item(s).

In some implementations, the AAV may be configured for aerodynamics. For example, an aerodynamic housing may be included on the AAV that encloses the AAV control system 110, one or more of the rigid members 105, the frame 104 and/or other components of the AAV 100. The housing may be made of any suitable material(s) such as graphite, carbon fiber, aluminum, etc. Likewise, in some implementations, the location and/or the shape of the inventory (e.g., item or container) may be aerodynamically designed. For example, in some implementations, the inventory engagement mechanism may be configured such that, when the inventory is engaged, it is enclosed within the frame and/or housing of the AAV 100 so that no additional drag is created during transport of the inventory by the AAV 100. In other implementations, the inventory may be shaped to reduce drag and provide a more aerodynamic design of the AAV and the inventory. For example, if the inventory is a container and a portion of the container extends below the AAV when engaged, the exposed portion of the container may have a curved shape.

The propellers 102 and corresponding propeller motors are positioned at both ends of each rigid member 105. For inventory transport purposes, the propeller motors may be any form of motor capable of generating enough speed with the propellers to lift the AAV 100 and any engaged inventory thereby enabling aerial transport of the inventory. For example, for these purposes the propeller motors may each be a FX-4006-13 740 kv multi rotor motor. As will be described in more detail below, the power or other operating parameters associated with the propeller motors may be monitored to determine when a ground effect is influencing the parameters, such as may indicate a corresponding proximity to the ground or other surface.

Extending outward from each rigid member is a support arm 106 that is connected to a safety barrier 108. In this example, the safety barrier is positioned around and attached to the AAV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the frame 104 is the AAV control system 110. In this example, the AAV control system 110 is mounted in the middle and on top of the frame 104. The AAV control system 110, as discussed in further detail below with respect to FIG. 8, controls the operation, routing, navigation, communication, distance determining functions, and the inventory engagement mechanism of the AAV 100.

Likewise, the AAV 100 includes one or more power modules 112. In this example, the AAV 100 includes two power modules 112 that are removably mounted to the frame 104. The power module for the AAV may be in the form of battery power, solar power, gas power, super capacitor, fuel cell, alternative power generation source, or a combination thereof. For example, the power modules 112 may each be a 6000 mAh lithium-ion polymer battery, polymer lithium ion (Li-poly, Li-Pol, LiPo, LIP, PLI or Lip) battery. The power module(s) 112 are coupled to and provide power for the AAV control system 110 and the propeller motors.

In some implementations, one or more of the power modules may be configured such that it can be autonomously recharged, removed and/or replaced with another power module while the AAV is landed. For example, when the AAV lands at a delivery location, relay location and/or materials handling facility, the AAV may engage with a charging member at the location that will recharge the power module and/or the power module may be removed and replaced.

As mentioned above, the AAV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. The inventory engagement mechanism may be positioned beneath the AAV control system 110. In implementations with additional rigid members, the AAV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the AAV control system 110.

While the implementations of the AAV discussed herein utilize propellers to achieve and maintain flight, in other implementations, the AAV may be configured in other manners. For example, the AAV may include a combination of both propellers and fixed wings. For example, the AAV may utilize one or more propellers to enable takeoff and landing and a fixed wing configuration or a combination wing and propeller configuration to sustain flight while the AAV is airborne.

Figure 2:
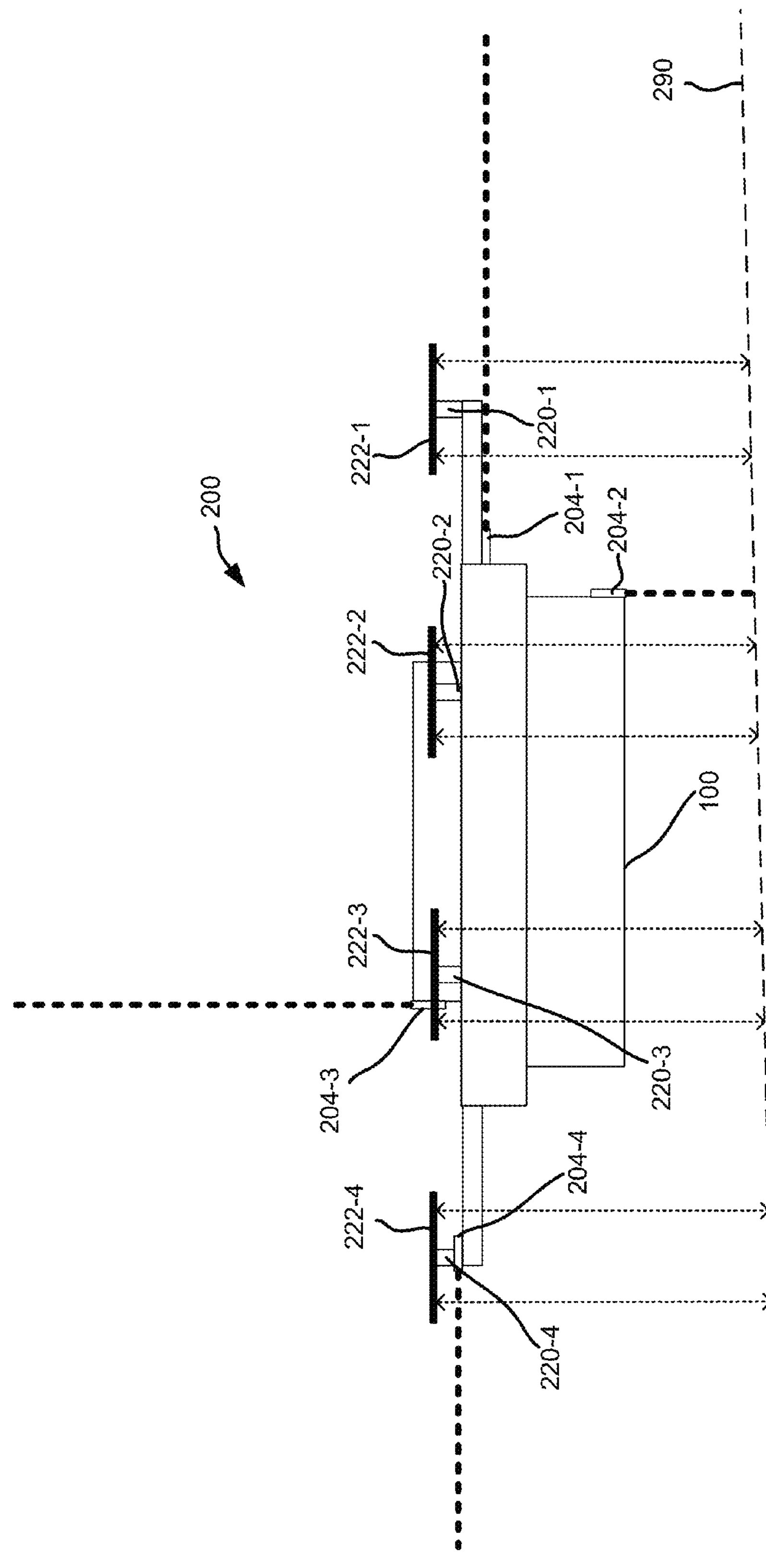
FIG. 2 depicts a block diagram of a side view of an automated aerial vehicle, according to an implementation.

FIG. 2 depicts a block diagram of a side view 200 of an AAV 100, according to an implementation. In the side view of the AAV illustrated in FIG. 2, four motors 220-1 to 220-4 and corresponding propellers 222-1 to 222-4 are visible. In other implementations, additional or fewer motors 220 and/or propellers 222 may be included in the AAV 100. For example, in some implementations, propellers may be mounted in pairs. FIG. 2 illustrates the right side view of the AAV 100 such that the motor 220-1 is at the front of the AAV 100 and the motor 220-4 is at the rear of the AAV 100. In this example, the motors 220 may all be mounted at 90 degrees with respect to the AAV 100, although in other examples the motors 220 may be oriented at different orientations which may be adjustable.

As shown in FIG. 2, four distance determining elements 204-1 to 204-4 are mounted to the AAV 100. In various implementations, one or more distance determining elements 204 may be included on the AAV 100 as part of one or more distance determining systems and may be oriented in different directions. For example, the distance determining element 204-1 may be mounted to the AAV 100 and oriented to emit a signal that projects from the front of the AAV 100. The distance determining element 204-2 may be mounted to the AAV 100 and oriented to emit a signal that projects down from the AAV 100. The distance determining element 204-3 may be mounted to the AAV 100 and oriented to emit a signal that projects above the AAV 100. The distance determining element 204-4 may be mounted to the AAV 100 and oriented to emit a signal that projects behind the AAV 100. In various implementations, the distance determining elements may utilize any of sonar, radar, lidar, lasers, etc. In certain implementations, the distance determining elements 204 may not emit signals but may receive light or other input for determining distances in the indicated directions (e.g., imaging systems, etc.).

As shown in FIG. 2, the AAV 100 is illustrated as hovering above a sloped ground portion 290. In the illustrated implementation, the propeller 222-1 at the front of the AAV 100 is closer to the ground 290 than the propeller 222-4 at the back of the AAV. As described above, each of the propellers 222-1 to 222-4 produces an airflow that the ground 290 interferes with as part of a ground effect. As a result, a parameter associated with each of the propellers (e.g., a voltage, current or power supplied to each of the propeller motors 220-1 to 220-4, a speed of each of the propeller motors, an effective thrust of each of the propellers, etc.) may be monitored to determine an influence of a ground effect. Utilizing such techniques, the parameter associated with the propeller 222-1 may be determined to indicate a closer proximity to the ground 290 than the parameter associated with the propeller 222-4.

In various implementations, this type of information may be utilized for various purposes. For example, as will be described in more detail below with respect FIG. 7, during a landing process it may be desirable for the AAV 100 to not land on a portion of the ground with too steep of a slope or other undesirable characteristics (e.g., a stepped region), which could cause the AAV 100 to slide, fall over, etc., in such a way that the AAV could be damaged. As another example, if the AAV 100 is flying along a flight path close to the ground and a determination is made that the ground 290 is sloping upward toward the path of the AAV, an evasive maneuver may be performed to raise the elevation of the AAV so as to avoid a collision with the ground. In various implementations, such determinations as to the profile of a surface may also be utilized to identify a current location of the AAV. For example, certain locations may be known to have certain surface profiles, which may be at least partially identified by techniques such as those described above.

In various implementations, the above described techniques utilizing the influences of ground effects may be used as a backup to a primary sensor system (e.g., utilizing the distance determining elements 204-1 to 204-4) for determining distances to the ground or other surfaces. It will be appreciated that by utilizing different types of systems that rely on different physical principles, the overall reliability for the operation of the AAV may be improved. For example, if the primary sensor system fails or is inhibited by certain weather or atmospheric conditions, the techniques utilizing the influences of ground effects may still be operational, and thus may serve as an effective backup to the primary sensor system.

In various implementations, the primary sensor system may provide an output that indicates a first distance to the ground, which may be compared to a second distance to the ground indicated by ground effect techniques as part of the backup functions, wherein a difference between the distances may indicate an issue with the output of the primary sensor system. For example, the distance determining element 204-2 of the primary sensor system may provide an output that indicates a first distance from the bottom front of the AAV to the ground. As described herein, a second distance from the bottom front of the AAV to the ground may be determined based on one or more parameters that are influenced by ground effects (e.g., parameters associated with the propellers 222-1 and/or 222-2). For example, as will be described in more detail below with respect to FIG. 5, stored data may be referenced for correlating such parameter levels to distances to the ground.

A difference between the first distance and the second distance may indicate an issue with the primary sensor system. For example, if the first distance indicates that the bottom of the AAV is a significant distance away from the ground (e.g., several feet away), while the second distance indicates that the bottom of the AAV is proximate to the ground (e.g., within a few inches), there may be an issue with the output of the primary sensor system. As noted above, in various implementations such issues may be related to factors such as malfunctions of the primary sensor system, external conditions (e.g., atmospheric, weather, etc.) inhibiting the ability to accurately indicate distances, etc. As will be described in more detail below with respect to FIG. 5, in response to such issues, various actions may be taken. For example, the AAV may be flown at a higher altitude as an additional safety margin due to the issues with the primary sensor system, the AAV may be instructed to land so that the primary sensor system can be repaired, etc.

For configurations such as that illustrated in FIG. 2 where the propellers 222 are fixed relative to the body of the AAV, adjustments to the orientation of the propellers may be accomplished in some instances by manipulating the pitch, yaw and/or roll of the AAV as a whole. It will be appreciated that with AAVs, such as a quad-copter or an octo-copter, the general direction of travel of the AAV may be maintained even though the pitch, yaw and/or roll is altered. For example, an AAV may be moving north and the yaw may be adjusted so that the AAV 100 rotates in a clockwise direction. The rotation can occur without altering the direction of flight. Likewise, the pitch and/or roll can be adjusted without altering the flight path of the AAV 100. In various alternative implementations, the orientations of the propellers 222 may also be adjustable relative to the body of the AAV (e.g., utilizing adjustable motor mounts, etc.).

Figure 3:
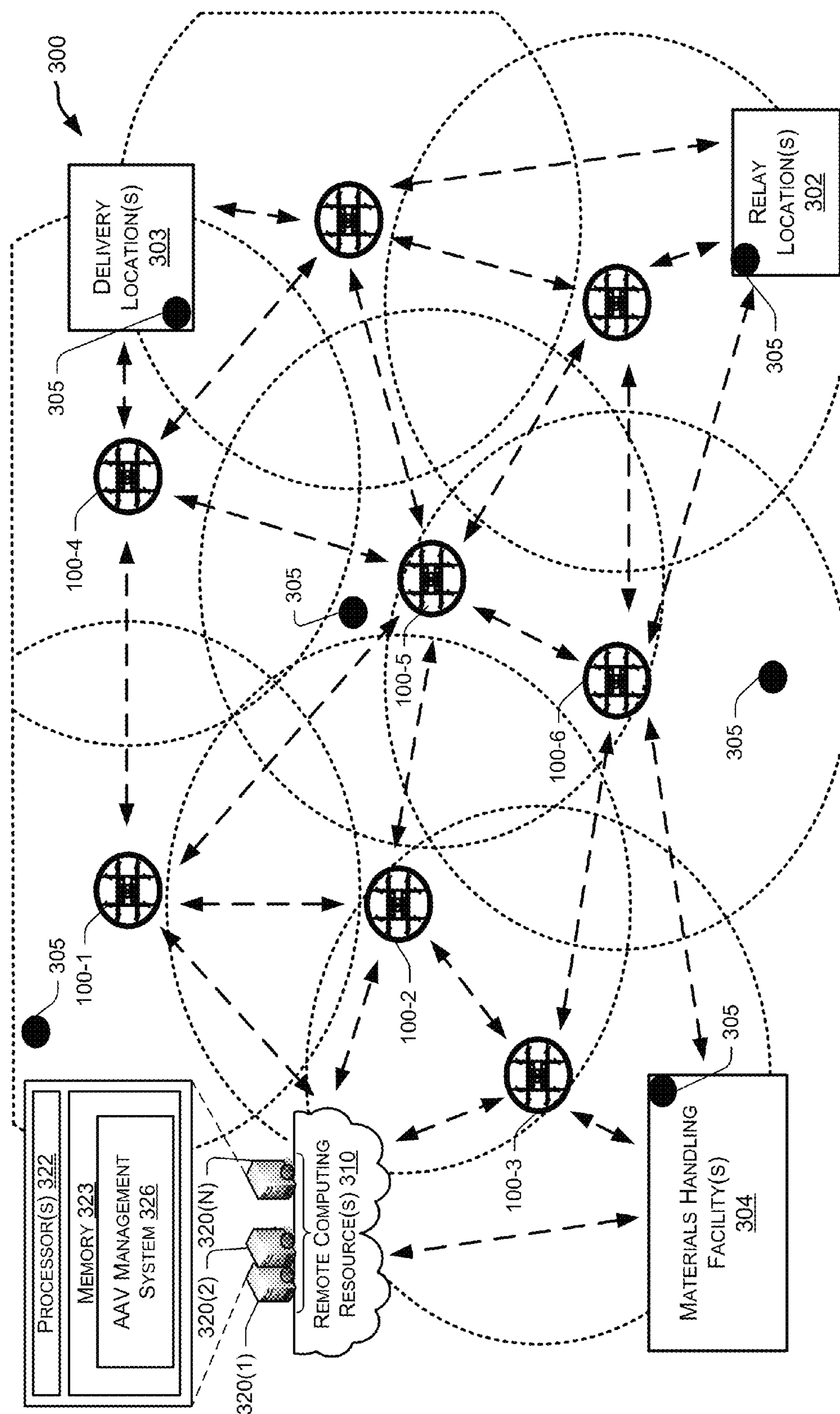
FIG. 3 depicts a diagram of an automated aerial vehicle environment, according to an implementation.

FIG. 3 depicts a block diagram of an AAV network 300 that includes AAVs 100, delivery locations 303, relay locations 302, materials handling facilities 304 and remote computing resources 310, according to an implementation. In addition, one or more fixed position transmitters 305 may be included in the environment that transmit fixed position information (e.g., geographic coordinates). The fixed position transmitters may be included at any known, fixed location. For example, the fixed position transmitters may be included on a materials handling facility(s) 304, relay location(s) 302, delivery location(s) 303, on cellular towers (not shown), on buildings, on landing areas, or at any other known location.

Each of the AAVs 100, delivery locations 303, relay locations 302, materials handling facilities 304 and/or remote computing resources 310 may be configured to communicate with one another. For example, the AAVs 100 may be configured to form a wireless mesh network that utilizes Wi-Fi or another wireless means of communication, each AAV communicating with other AAVs within wireless range. In other implementations, the AAVs 100, AAV management system 326, materials handling facilities 304, relay locations 302 and/or the delivery locations 303 may utilize existing wireless networks (e.g., cellular, Wi-Fi, satellite) to facilitate communication. Likewise, the remote computing resources 310, materials handling facilities 304, delivery locations 303 and/or relay locations 302 may also be included in the wireless mesh network. In some implementations, one or more of the remote computing resources 310, materials handling facilities 304, delivery locations 303 and/or relay locations 302 may also communicate with each other via another network (wired and/or wireless), such as the Internet.

The remote computing resources 310 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 310 may include one or more servers, such as servers 320(1), 320(2), . . . , 320(N). These servers 320(1)-(N) may be arranged in any number of ways, such as server farms, stacks, and the like that are commonly used in data centers. Furthermore, the servers 320(1)-(N) may include one or more processors 322 and memory 323 which may store an AAV management system 326.

The AAV management system 326 may be configured, for example, to communicate with the delivery locations 303, AAVs 100, materials handling facilities 304, and/or relay locations 302. As an example, position information for each AAV 100 may be determined and shared among AAVs. Each AAV may periodically transmit, for example, ADS-B information to other AAVs in the network. When information, such as ADS-B information, is sent to or from an AAV, the information may include an identifier for the AAV and each AAV may act as a node within the network, forwarding the information until it is received by the intended AAV. For example, the AAV management system 326 may send a message to AAV 100-6 by transmitting the information and the identifier of the intended receiving AAV to one or more of AAVs 100-1, 100-2, 100-3, 100-4 that are in wireless communication with the AAV management system 326. Each receiving AAV will process the identifier to determine if it is the intended recipient and then forward the information to one or more other AAVs that are in communication with the AAV. For example, AAV 100-2 may forward the message and the identification of the intended receiving AAV to AAV 100-1, 100-3 and 100-5. In such an example, because 100-3 has already received and forwarded the message, it may discard the message without forwarding it again, thereby reducing load on the mesh network 300. The other AAVs, upon receiving the message, may determine that they are not the intended recipients and forward it on to other nodes. This process may continue until the message reaches the intended recipient.

In some implementations, if an AAV loses communication with other AAVs via the wireless mesh network, it may activate another wireless communication path to regain connection. For example, if an AAV cannot communicate with any other AAVs via the mesh network 300, it may activate a cellular and/or satellite communication path to obtain communication information from the AAV management system 326, materials handling facility 304, relay location 302 and/or a delivery location 303. If the AAV still cannot regain communication and/or if it does not include an alternative communication component, it may automatically and autonomously navigate toward a designated location (e.g., a nearby materials handling facility 304, relay location 302 and/or delivery location 303).

The wireless mesh network 300 may be used to provide communication between AAVs (e.g., to share weather information including wind speeds and directions, location information, routing information, landing areas), the AAV management system 326, materials handling facilities 304, delivery locations 303 and/or relay locations 302. In various implementations, such communications may include information or data that may be utilized when techniques are performed for determining a distance to the ground or other surfaces. For example, as will be described in more detail below, in some instances a determination may need to be made as to whether an airflow from a propeller was influenced by a strong wind or was influenced by a ground effect (e.g., which may indicate a corresponding proximity to the ground). As part of such determinations, communications regarding wind speeds and directions at various locations may be utilized. In various implementations, a verification of an influence by a ground effect may also be provided in part by communications from other sources. For example, other sources (e.g., other AAVs, relay locations 302, etc.) that have imaging devices or other sensors for viewing or otherwise determining the height or relative coordinates of a nearby AAV may be able to provide verification as to the relative position of the AAV with respect to the ground.

In addition, in some implementations, the wireless mesh network may be used to deliver content and/or other information to other computing resources, such as personal computers, electronic book reading devices, audio players, mobile telephones, tablets, desktops, laptops, etc. For example, the mesh network may be used to deliver electronic book content to electronic book reading devices of customers.

Figure 4:
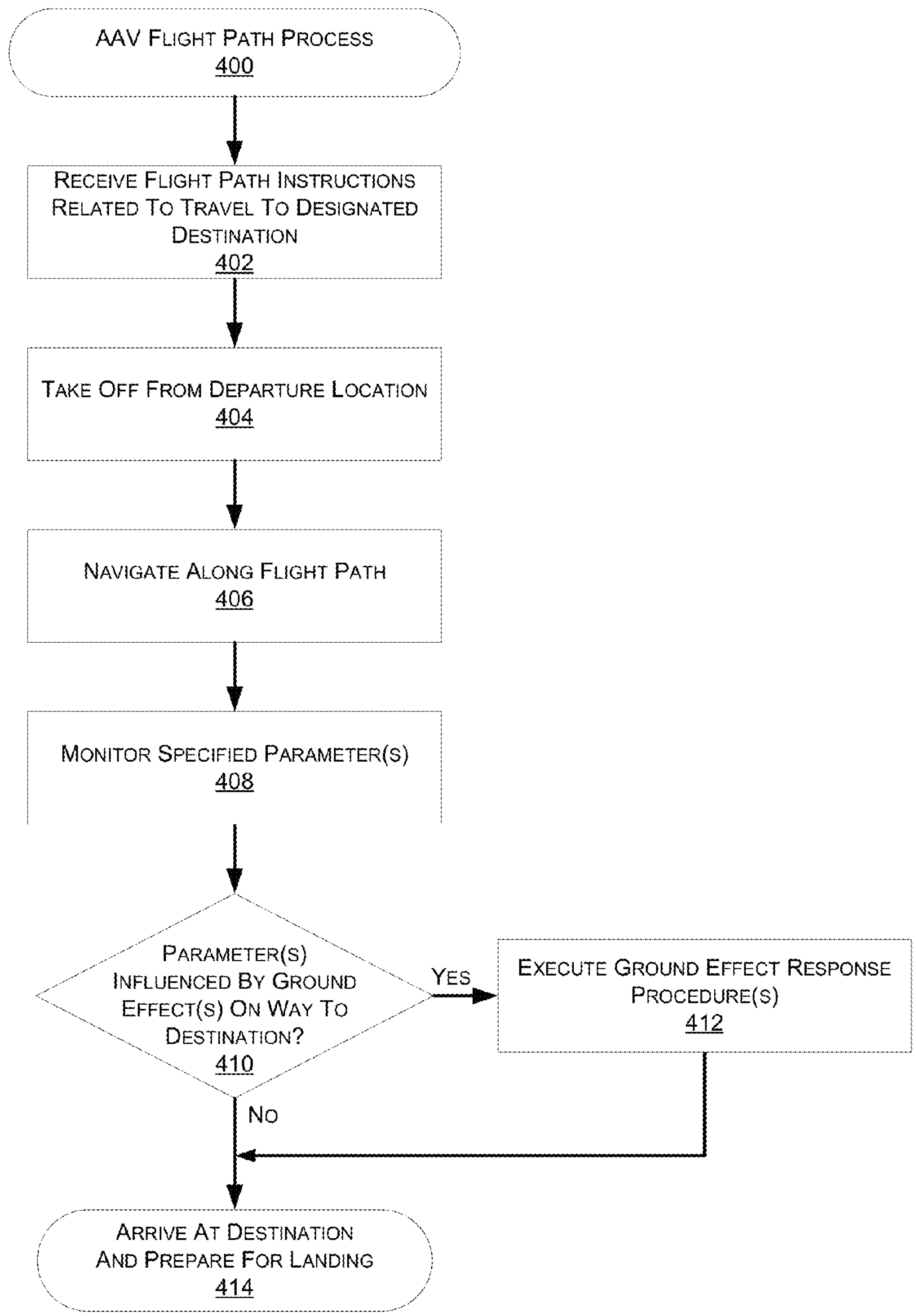
FIG. 4 depicts a flow diagram of an automated aerial vehicle flight path process, according to some implementations.

FIG. 4 is a flow diagram illustrating an example AAV flight path process 400, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process 400 begins with an AAV receiving flight path instructions related to travel to a destination, as in 402. In various implementations, the destination may be related to a delivery process or other functions of the AAV. For example, with respect to a delivery process, an order for an item may be received and an AAV may be selected for transporting the item from a materials handling facility to a delivery location for a user (e.g., see FIG. 3). As another example, after the delivery is completed, the destination may become the materials handling facility to which the AAV returns. In various implementations, the flight path instructions may be determined by the AAV control system 110, or by the AAV management system 326 or other remote computing resource, or by a combination of such systems. For example, the AAV management system 326 or other remote computing resource may send basic flight path instructions to the AAV (e.g., including the start and end points), while the AAV control system 110 may have navigation capabilities that allow the rest of the flight path instructions to be determined.

Once the flight path instructions have been received, the AAV departs from its current location, as in 404. As noted above, in various implementations the current location may be associated with a materials handling facility, a delivery location after a delivery has been completed, etc. Once the AAV departs, the AAV navigates along the flight path, as in 406. As part of the navigation, the AAV may follow a route as generally indicated by the flight path instructions, and may also have capabilities for sensing and reacting to any dynamic events that may occur (e.g., avoiding any obstacles such as other AAVs, structures, etc.).

While the AAV is navigating along the flight path, one or more specified parameters are monitored, as in 408. As described above, one or more operating parameters of an AAV may be influenced by ground effects. For example, as the AAV approaches the ground or another surface, in order to maintain the AAV at a specified height above the ground, an autopilot or other feedback system (e.g., monitoring effective thrust) may reduce the power supplied to the one or more propellers, in accordance with the ground effect. In this regard, the one or more parameters that are monitored may include a voltage, current or power supplied to one or more of the propeller motors, a speed of the propeller motor or associated propeller, an effective thrust of a propeller, a speed of the airflow of the propeller, etc. It will be appreciated that in an existing system with autopilot or other feedback systems, no additional physical modifications may need to be made to the system in order to implement the techniques described herein. In such cases, only programming modifications may be required to monitor the already existing systems (e.g., to determine when changes to parameters occur as influenced by ground effects).

As the one or more parameters are monitored, a determination is made as to whether the parameters are influenced by one or more ground effects as the AAV travels to the destination, as in 410. In various implementations, the determination as to whether one or more of the parameters are influenced by ground effects may include comparing the parameter levels and/or changes to various thresholds. For example, a power level required for a propeller motor for the AAV to hover away from the ground may be known to be higher than a lower power level that is required to hover near the ground under the influence of a ground effect. Thus, a threshold may be established that indicates when the power level has dropped to or is otherwise at the lower level as indicating an influence of a ground effect.

In various implementations, a verification may also be performed as to whether a parameter has been influenced by a ground effect as opposed to another type of phenomenon. For example, given that the parameter may be related to the airflow from a propeller, in addition to a ground effect, other types of phenomena may influence the parameter (e.g., a strong gust of wind). As such, the parameter may be monitored for a specified time period to confirm the consistency of the parameter level. For example, if the parameter level has resulted from a strong gust of wind or other temporary phenomena, the parameter level will likely fluctuate over time. In contrast, if the parameter level has resulted from the influence of a ground effect, the parameter level should remain relatively constant while the AAV remains at a given distance from the surface.

If the one or more parameters are determined to be influenced by ground effects, as in 410, one or more ground effect response procedures may be executed, as in 412. An example ground effect response process including various response procedures will be described in more detail below with respect to FIG. 5. Once the ground effect response procedures have been executed, as in 412, or if the one or more monitored parameters are determined to not have been influenced by ground effects on the way to the destination, as in 410, the AAV arrives at the designated destination and prepares for landing, as in 414. An example landing process for the AAV will be described in more detail below with respect to FIG. 6.

In various implementations, the determinations as to whether various parameters are influenced by ground effects on the way to the destination and as to whether any response procedures will be executed, as well as various associated steps for executing the response procedures, may be determined by the AAV control system 110, or by the AAV management system 326 or other remote computing resources, or by a combination of such systems. For example, the AAV management system 326 or other remote computing resources may receive data regarding the parameters from the AAV and may perform portions or all of the analysis for determining if the parameters are influenced by ground effects and, if so, what response procedures will be executed. Alternatively, such functions may be performed entirely by the AAV control system 110, which in various implementations may report such occurrences as well as any related data to the AAV management system 326 or other remote computing resources.

Figure 5:
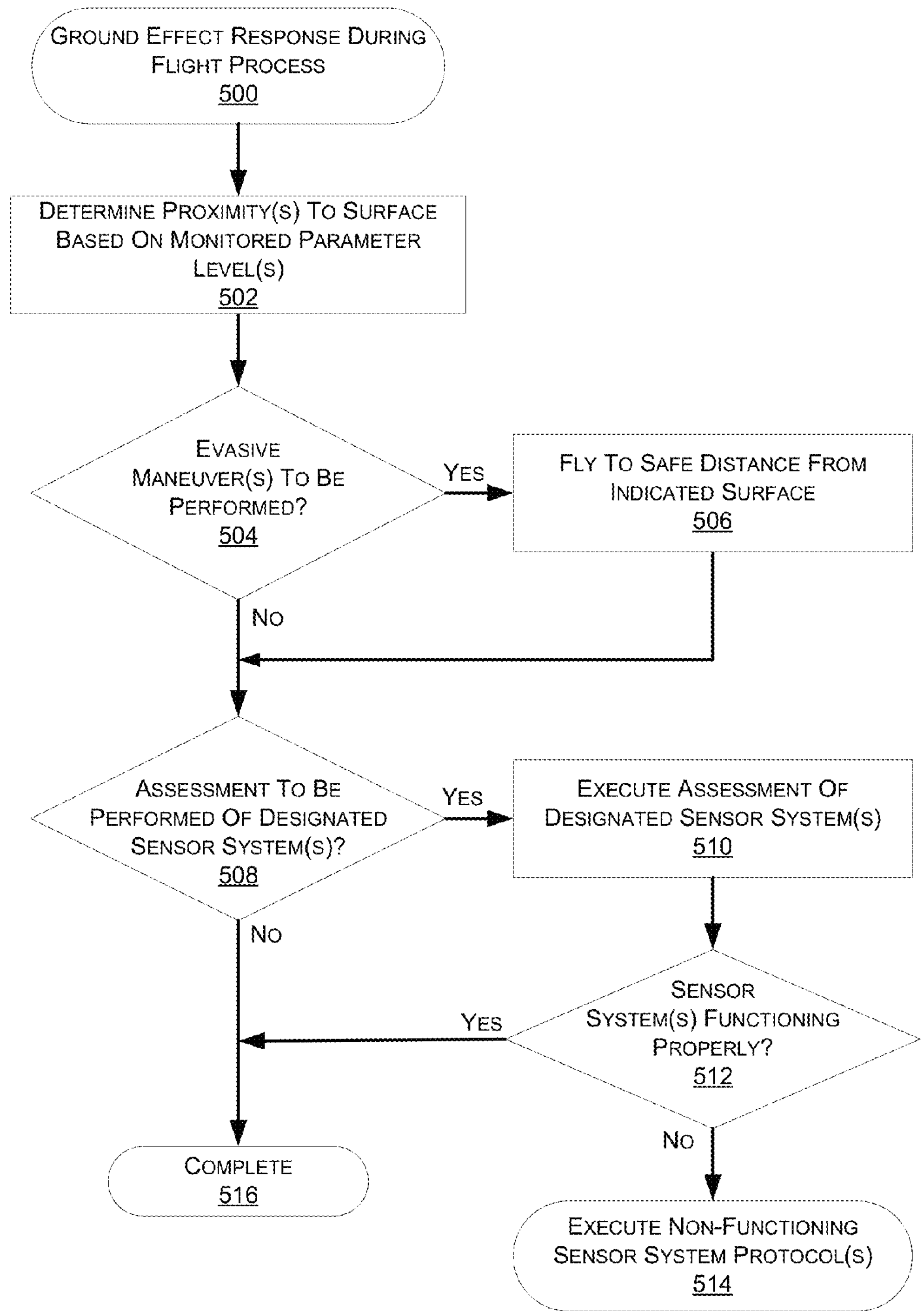
FIG. 5 depicts a flow diagram of a ground effect response during flight process, according to some implementations.

FIG. 5 depicts a flow diagram of an example ground effect response during flight process 500, according to some implementations. The example process begins with determining one or more potential proximities to a surface based on one or more monitored parameter levels, as in 502. In various implementations, a lookup table, graph, function, or other mechanism may be utilized for correlating parameter levels with potential proximities to a surface. For example, for a given AAV with a particular weight load (e.g., from carrying an item for delivery), data may be collected and/or calculated regarding the effect on parameter levels as they are influenced by a ground effect as the AAV approaches the ground. In various implementations, machine learning, modeling and/or other techniques may also or alternatively be utilized as part of a process with respect to the influences of the ground effects to indicate at what levels parameters are expected to be for a given distance of the AAV from a surface. Using such techniques, potential proximities to a surface may be determined based on monitored parameter levels during flight.

In various implementations, once a number of potential proximities have been determined (e.g., as associated with different propellers of the AAV), the potential proximities may be processed and/or utilized for various purposes. For example, as will be described in more detail below with respect to FIG. 7, the different proximities may be utilized to determine a profile of the surface (e.g., sloped, curved, having a stepped feature, etc.). As another example, the different proximities may be mathematically averaged (e.g., utilizing a weighted or other function) in order to improve the accuracy of a general determined proximity of the AAV to the surface. As another example, based on a comparison between the determined proximities, one or more of the proximities may be determined to correspond to outlier data points that do not appear to represent actual surface distances and should be disregarded. In some cases, such outlier data points may be caused by various factors (e.g., problems or interference with the airflow of one or more of the propellers, etc.).

Once the monitored parameter levels have been utilized to determine potential proximities to a surface, a determination is made as to whether one or more evasive aerial maneuvers will be performed, as in 504. For example, if a potential proximity indicates that the AAV is in danger of colliding with the ground, an evasive aerial maneuver may be performed to fly the AAV to a safe elevation above the ground. As another example, if the potential proximities associated with different propellers of the AAV indicate that the ground is sloped, as part of the aerial maneuver it may be desirable to have the AAV not only fly up, but also potentially cease forward motion so as to avoid colliding with the sloped ground. If one or more evasive aerial maneuvers are to be performed, as in 504, the AAV is flown to a safe distance from the indicated surface, as in 506.

Once the AAV has flown to a safe distance from the indicated surface, as in 506, or if evasive aerial maneuvers are not to be performed, as in 504, a determination is made as to whether an assessment will be performed of designated sensor systems, as in 508. In various implementations, the techniques described herein for determining a proximity to the ground or other surface may be utilized in addition to one or more additional sensor systems. It will be appreciated that such redundancies may increase the overall safety for the operation of the AAV (e.g., in case one of the systems fails or is otherwise inhibited in its operations, etc.). In one implementation, a primary sensor system utilizing technologies such as imaging, sonar, radar, lidar, infrared, laser, etc., may be utilized as a primary ground sensing system during flight, while the ground effect based techniques described herein may be utilized as a backup to the primary sensor system.

If an assessment is to be performed of one or more designated sensor systems (e.g., a primary sensor system), as in 508, the assessment of the designated sensor systems is executed, as in 510. Once the assessment has been executed, a determination is made as to whether the one or more assessed sensor systems are functioning properly, as in 512. If the one or more sensor systems are not functioning properly, one or more sensor system protocols for non-functioning sensor systems are executed, as in 514. In various implementations, if it is determined that a primary sensor system is not functioning or otherwise inhibited (e.g., by atmospheric or weather conditions such as rain, snow, fog, sun, or by certain types of reflections, etc.), additional safety margins during the flight may be implemented. For example, if the original flight path called for the AAV to be flown near the ground, the protocols may dictate that the AAV should now be flown at a significantly increased height, as an additional safety margin. As another example, the protocols may dictate that the AAV should be landed at the nearest possible safe location, at which it will be repaired or retrieved by an agent to address the issues with the primary sensor system. If it is determined that the one or more sensor systems are functioning properly, as in 512, or if no assessment is to be performed of any designated sensor systems, as in 508, the process completes, as in 516.

Figure 6:
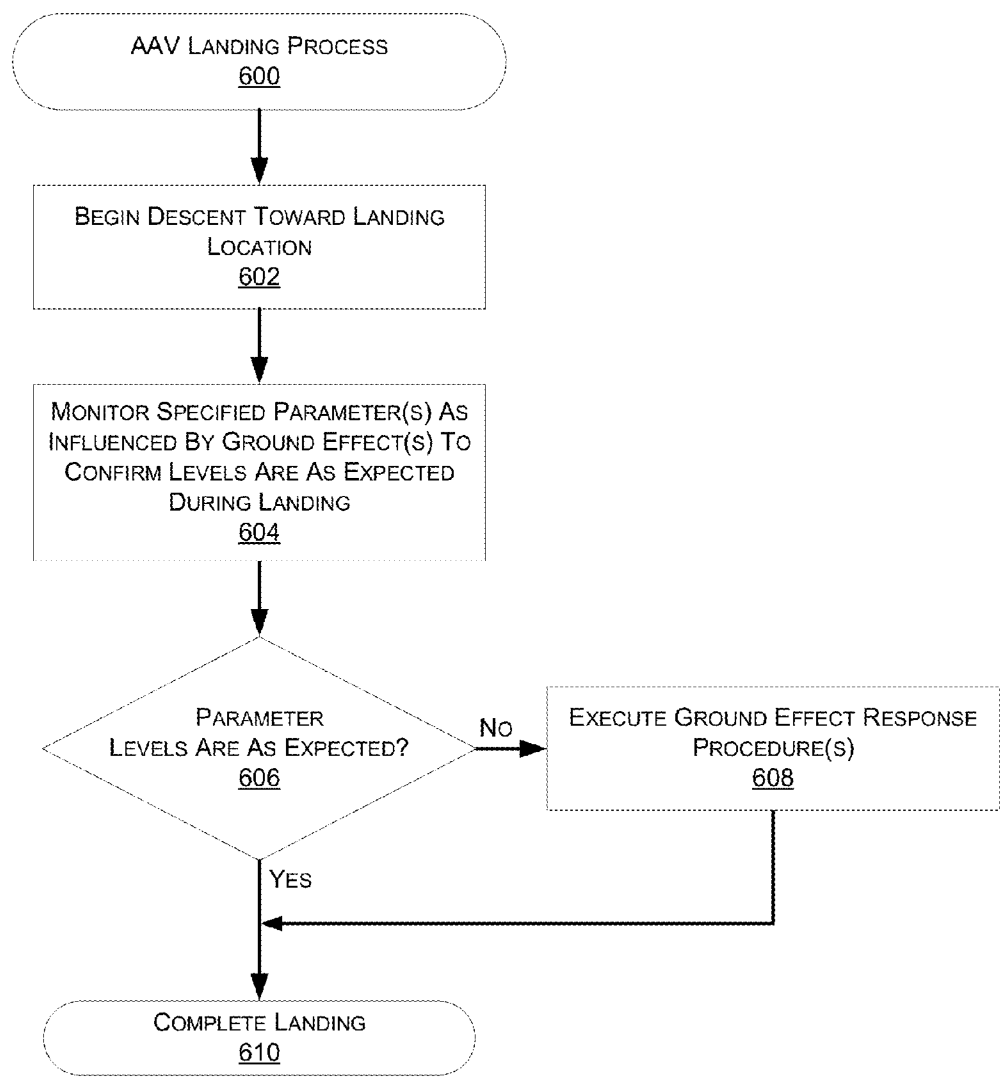
FIG. 6 depicts a flow diagram of an automated aerial vehicle landing process, according to some implementations.

FIG. 6 depicts a flow diagram of an example AAV landing process 600, according to some implementations. The example process begins with the AAV descending toward a designated landing location, as in 602. In various implementations, the designated landing location may be specified as part of original flight path instructions, or may be selected as the AAV is approaching the designated destination. As the AAV descends toward the landing location, one or more specified parameters as influenced by one or more ground effects are monitored to confirm that the parameter levels are as expected during the landing, as in 604. It will be appreciated that, in contrast to travel at higher elevations where ground effects are not expected to significantly influence the parameters, during a landing as the AAV approaches the ground, the parameter levels are expected to change as they are influenced by corresponding ground effects. As an example, if a landing location is expected to be flat and even, it may be expected that parameters associated with propellers at the front and rear of the AAV will have similar changes to their levels as influenced by ground effects as the AAV descends. However, if the changes to the levels that occur corresponding to the front and rear of the AAV during landing are not similar, this may indicate an uneven surface, in which case a new landing location may be selected, as will be described in more detail below with respect to FIG. 7.

As the one or more specified parameters are monitored during the landing, a determination is made as to whether the parameter levels that are occurring are consistent with the expected parameter levels during the landing, as in 606. If the parameter levels that are occurring are not consistent with expectations, one or more ground effect response procedures are executed, as in 608. An example ground effect response process including various response procedures will be described in more detail below with respect to FIG. 7. Once the ground effect response procedures have been executed, as in 608, or if the parameter levels during landing are consistent with expectations, as in 606, the landing is completed, as in 610.

Figure 7:
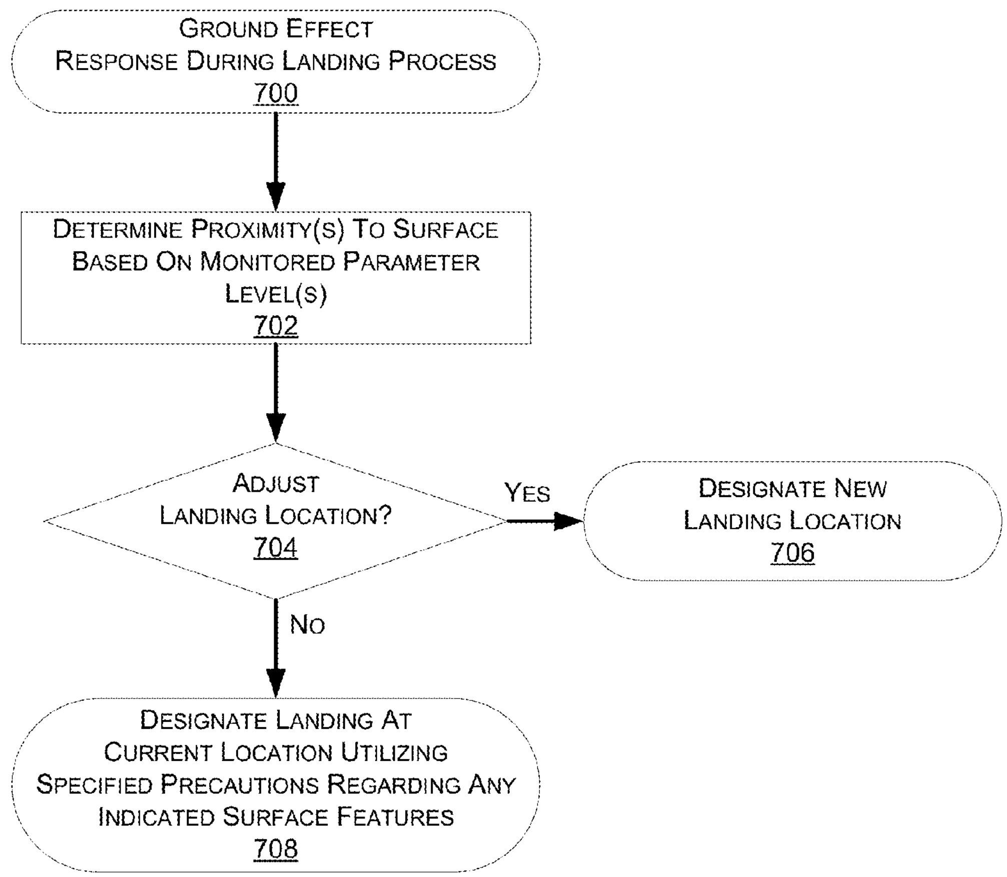
FIG. 7 depicts a flow diagram of a ground effect response during landing process, according to some implementations.

FIG. 7 depicts a flow diagram of an example ground effect response during landing process 700, according to some implementations. The example process begins by determining one or more potential proximities to a surface based on one or more monitored parameter levels, as in 702. The process for determining the potential proximities may be similar to that described above with respect to block 502 of FIG. 5. After the monitored parameter levels have been utilized to determine potential proximities to a surface, a determination is made as to whether a landing location will be adjusted, as in 704. In various implementations, a landing location may be adjusted if a current landing location is determined to be potentially unsafe for a landing by the AAV. For example, the current landing location may be determined to be uneven (e.g., with a significant slope, step height, edge, etc.), which could cause the AAV to slide, roll over, fall, etc., in a way that could be damaging to the AAV. In various implementations, different proximities of different portions of the AAV to a surface may indicate that the surface is uneven. For example, if a parameter associated with a front propeller indicates that the front of the AAV is very close to a corresponding portion of the landing surface, while a parameter associated with a rear propeller indicates that the rear of the AAV is a more significant distance from a corresponding portion of the landing surface, such indications may be consistent with an uneven landing surface (e.g., significantly sloped, stepped, etc.). In this regard, parameters associated with propellers in the middle of the AAV may also provide useful information (e.g., for distinguishing between whether the surface is sloped, stepped, etc.).

If it is determined that the landing location will be adjusted, as in 704, a new landing location is designated, as in 706. If it is determined that the landing location will not be adjusted, the landing may be designated at the current location utilizing any specified precautions regarding any indicated surface features, as in 708. For example, the indicated surface features may include an indication that the current landing location has a moderate enough slope for the AAV to safely land on, as long as certain precautions are utilized (e.g., descending more slowly given the nature of the slope, etc.).

It will be appreciated that while in FIGS. 4-7 certain analysis and response procedures have generally been presented as associated with either a flight path process or a landing process, in various implementations such techniques may be utilized in any combination with respect to either process, or other processes. For example, during a takeoff process, or if an AAV is instructed to travel close to the ground for at least part of a flight path process, certain techniques described above with respect to a landing process may be utilized, such as comparing the monitored parameter levels to expected levels as influenced by ground effects. In such cases, if the parameter levels are not as expected, such may indicate that the AAV is not flying at the expected distance from the ground and/or that the ground surface profile is not as expected, for which various response procedures may be executed. For example, as part of one response procedure, the AAV may be instructed to rapidly increase elevation in order to avoid a collision with the ground.

Figure 8:
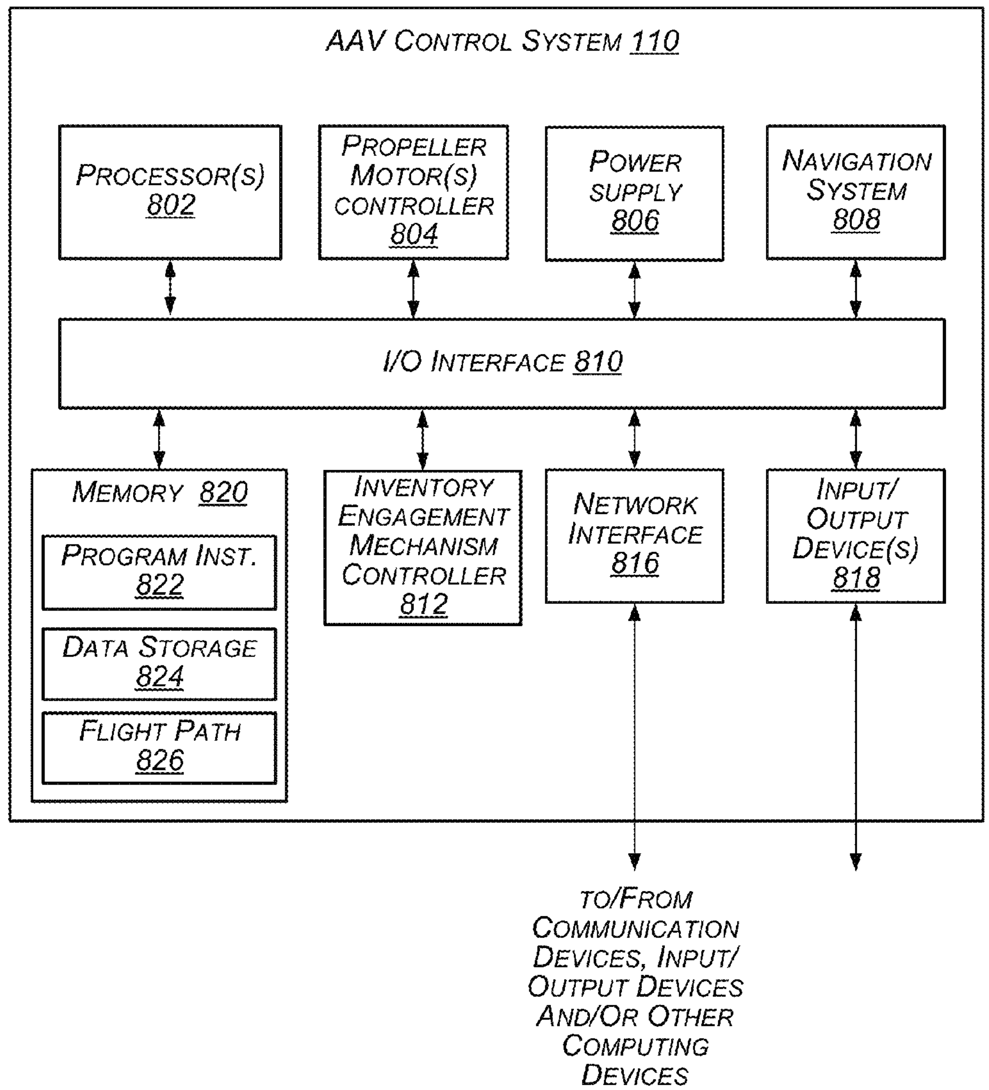
FIG. 8 is a block diagram illustrating various components of an automated aerial vehicle control system, according to an implementation.

FIG. 8 is a block diagram illustrating an example AAV control system 110 of the AAV 100. In various examples, the block diagram may be illustrative of one or more aspects of the AAV control system 110 that may be used to implement the various systems and methods discussed above. In the illustrated implementation, the AAV control system 110 includes one or more processors 802, coupled to a non-transitory computer readable storage medium 820 via an input/output (I/O) interface 810. The AAV control system 110 may also include a propeller motor controller 804, power supply module 806 and/or a navigation system 808. The AAV control system 110 further includes an inventory engagement mechanism controller 812, a network interface 816, and one or more input/output devices 818.

In various implementations, the AAV control system 110 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824 and flight path data 826, respectively. In other implementations, program instructions, data and/or flight paths may be received, sent or stored upon different types of computer-accessible media, such as non-transitory media, or on similar media separate from the non-transitory computer readable storage medium 820 or the AAV control system 110. Generally speaking, a non-transitory, computer readable storage medium may include storage media or memory media such as magnetic or optical media, e.g., disk or CD/DVD-ROM, coupled to the AAV control system 110 via the I/O interface 810. Program instructions and data stored via a non-transitory computer readable medium may be transmitted by transmission media or signals such as electrical, electromagnetic or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The propeller motor(s) controller 804 communicates with the navigation system 808 and adjusts the power of each propeller motor to guide the AAV along a determined flight path. As described above, as part of various techniques for determining distances to surfaces, various parameters related to the operation of the propeller motors may be monitored. For example, the voltage, current or power provided to one or more of the propellers may be monitored to determine if a ground effect is influencing the parameter, such as may indicate a proximity to a surface.

The power supply module 806 may control the charging and any switching functions associated with one or more power modules (e.g., batteries) of the AAV. The navigation system 808 may include a GPS or other similar system that can be used to navigate the AAV to and/or from a location. The inventory engagement mechanism controller 812 communicates with the motor(s) (e.g., a servo motor) used to engage and/or disengage inventory. For example, when the AAV is positioned over a level surface at a delivery location, the inventory engagement mechanism controller 812 may provide an instruction to a motor that controls the inventory engagement mechanism to release the inventory.

The network interface 816 may be configured to allow data to be exchanged between the AAV control system 110, other devices attached to a network, such as other computer systems, and/or with AAV control systems of other AAVs. For example, the network interface 816 may enable wireless communication between numerous AAVs. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more displays, image capture devices, thermal sensors, infrared sensors, time of flight sensors, accelerometers, pressure sensors, weather sensors, airflow sensors, distance sensors, etc. Multiple input/output devices 818 may be present and controlled by the AAV control system 110. As described above, one or more of these sensors may be utilized to assist in landings as well as avoid obstacles during flight.

As shown in FIG. 8, the memory may include program instructions 822 which may be configured to implement the example processes and/or sub-processes described above. The data storage 824 may include various data stores for maintaining data items that may be provided for determining flight paths, retrieving inventory, landing, identifying a level surface for disengaging inventory, executing distance determining functions, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 110 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 110. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the AAV control system 110 may be transmitted to the AAV control system 110 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AAV control system configurations.

Figure 9:
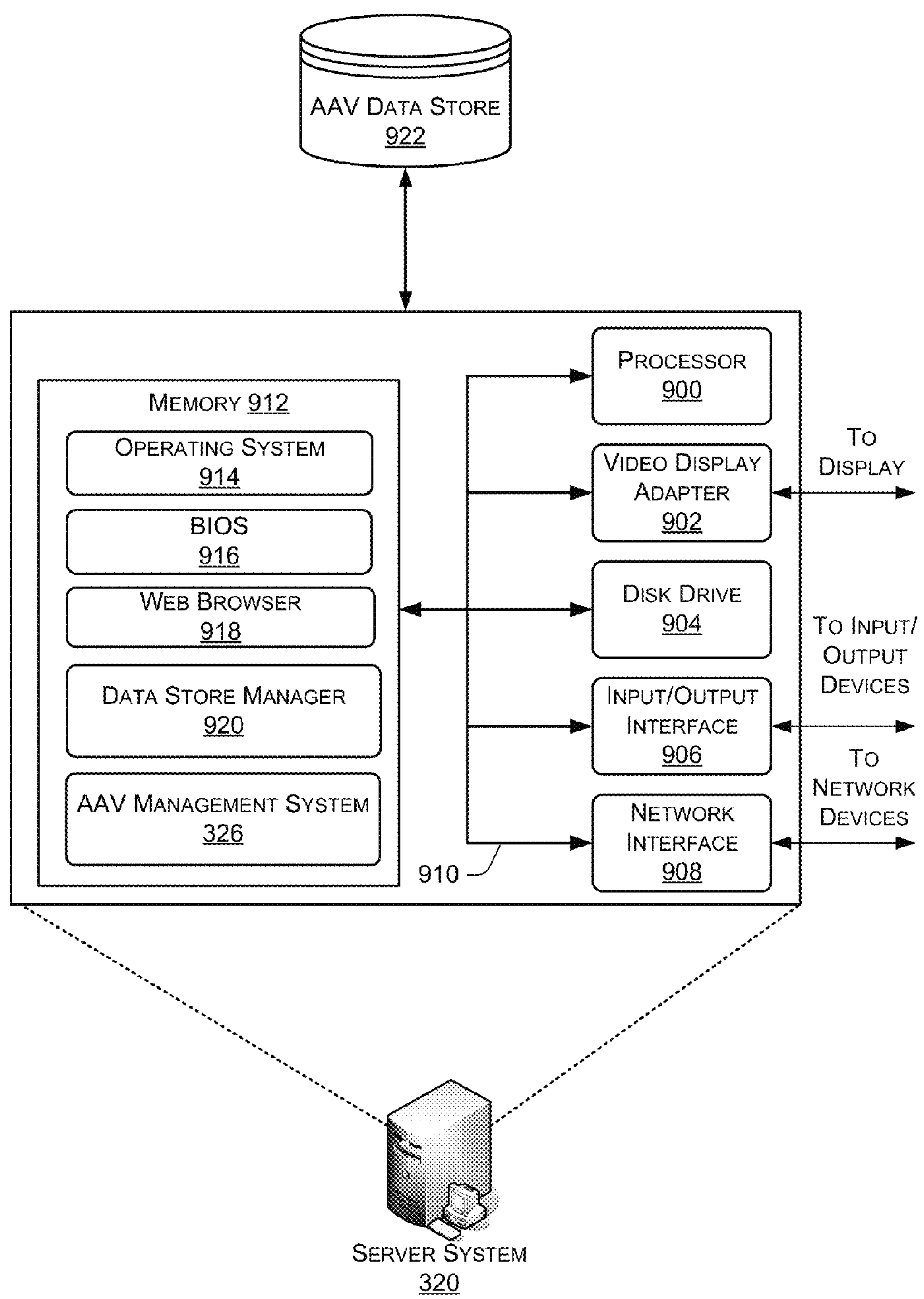
FIG. 9 is a block diagram of an illustrative implementation of a server system that may be used with various implementations.

FIG. 9 is a pictorial diagram of an illustrative implementation of a server system, such as the server system 320, that may be used in the implementations described herein. The server system 320 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the server system 320 to monitor and configure operation of the server system 320. The input/output interface 906 likewise communicates with external input/output devices not shown in FIG. 9, such as a mouse, keyboard, scanner, or other input and output devices that can be operated by an operator of the server system 320. The network interface 908 includes hardware, software, or any combination thereof, to communicate with other computing devices. For example, the network interface 908 may be configured to provide communications between the server system 320 and other computing devices, such as an AAV, materials handling facility, relay location and/or a delivery location, as shown in FIG. 3.

The memory 912 generally comprises random access memory (RAM), read-only memory (ROM), flash memory, and/or other volatile or permanent memory. The memory 912 is shown storing an operating system 914 for controlling the operation of the server system 320. A binary input/output system (BIOS) 916 for controlling the low-level operation of the server system 320 is also stored in the memory 912.

The memory 912 additionally stores program code and data for providing network services to the AAV management system 326. Accordingly, the memory 912 may store a browser application 918. The browser application 918 comprises computer executable instructions that, when executed by the processor 900, generate or otherwise obtain configurable markup documents such as Web pages. The browser application 918 communicates with a data store manager application 920 to facilitate data exchange between the AAV data store 922 and/or other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 320 can include any appropriate hardware and software for integrating with the AAV data store 922 as needed to execute aspects of one or more applications for the AAV management system, AAVs, materials handling facilities, delivery locations, and/or relay locations.

The data store 922 can include several separate data tables, databases or other data storage mechanisms and media for storing data relating to a particular aspect. For example, the data store 922 illustrated includes AAV information, weather information, wind speeds and directions, flight path information, source location information, destination location information, etc., which can be used to generate and deliver information to the AAV management system 326, materials handling facilities, delivery locations, AAVs, relay locations, and/or users. It should be understood that there can be many other aspects that may be stored in the AAV data store 922. The data stores 922 are operable, through logic associated therewith, to receive instructions from the server system 320 and obtain, update or otherwise process data in response thereto.

The memory 912 may also include the AAV management system 326, discussed above. The AAV management system 326 may be executable by the processor 900 to implement one or more of the functions of the server system 320. In one implementation, the AAV management system 326 may represent instructions embodied in one or more software programs stored in the memory 912. In another implementation, the AAV management system 326 can represent hardware, software instructions, or a combination thereof.

The server system 320, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An automated aerial vehicle, comprising:

first and second propellers;

first and second propeller motors that rotate the first and second propellers, respectively;

a power supply connected to the first and second propeller motors that provides power to the first and second propeller motors; and a control system, comprising:

one or more processors; and a memory coupled to the one or more processors and storing program instructions that when executed by the one or more processors cause the one or more processors to at least:

determine a first distance to a surface based at least in part on a level of a first parameter that is associated with the first propeller and that is influenced by a first ground effect, wherein the first ground effect corresponds to a condition in which an airflow of the first propeller is directed against the surface which increases an effective thrust of the first propeller and which influences the first parameter; and determine a second distance to the surface based at least in part on a level of a second parameter that is associated with the second propeller and that is influenced by a second ground effect, wherein the second distance is different than the first distance and the second ground effect corresponds to a condition in which an airflow of the second propeller is directed against the surface which increases an effective thrust of the second propeller and which influences the second parameter.

2. The automated aerial vehicle of claim 1, wherein the first and second distances are determined at least in part by referencing data that is stored in the memory for correlating levels of the parameters to distances from the surface.

3. The automated aerial vehicle of claim 1, wherein:

the level of the first parameter corresponds to a level of at least one of a voltage, current or power supplied from the power supply for rotating the first propeller; and the level of the second parameter corresponds to a level of at least one of a voltage, current or power supplied from the power supply for rotating the second propeller.

4. The automated aerial vehicle of claim 1, wherein the program instructions when executed by the one or more processors further cause the one or more processors to utilize the determined first and second distances to determine a profile of the surface.

5. The automated aerial vehicle of claim 1, wherein the program instructions when executed by the one or more processors further cause the one or more processors to fly the automated aerial vehicle along a flight path and the first ground effect reduces the amount of power required to be supplied to at least the first propeller motor for flying the automated aerial vehicle while the automated aerial vehicle is proximate to the surface.

6. The automated aerial vehicle of claim 5, wherein the control system further comprises an autopilot system that is utilized to control the amount of power supplied by the power supply to at least the first propeller motor and that automatically reduces the amount of power supplied when the automated aerial vehicle is proximate to the surface.

7. A system for determining a proximity to a surface, the system comprising:

an automated aerial vehicle, comprising:

a first propeller;

a second propeller;

a computing system, comprising:

one or more processors; and a memory coupled to the one or more processors and storing program instructions that when executed by the one or more processors cause the one or more processors to at least:

monitor first and second operating parameters that are associated with the first and second propellers, respectively;

detect a change in the first operating parameter as caused by a first ground effect, the first ground effect corresponding to a condition in which an airflow of the first propeller is directed against a surface which increases an effective thrust of the first propeller; and determine that a proximity of the first propeller to the surface is different than a proximity of the second propeller to the surface based at least in part on the detected change in the first operating parameter as caused by the first ground effect.

8. The system of claim 7, wherein the program instructions when executed by the one or more processors further cause the one or more processors to determine that the surface is at least one of sloped or uneven based at least in part on the determination that the proximity of the first propeller to the surface is different than the proximity of the second propeller to the surface.

9. The system of claim 8, wherein the surface corresponds to a first potential landing location and the program instructions when executed by the one or more processors further cause the one or more processors to fly the automated aerial vehicle to a second potential landing location based at least in part on the determination that the surface is at least one of sloped or uneven.

10. The system of claim 7, wherein the program instructions when executed by the one or more processors further cause the one or more processors to determine that the automated aerial vehicle is in danger of colliding with the surface based at least in part on the determination that the proximity of the first propeller to the surface is different than the proximity of the second propeller to the surface.

11. The system of claim 7, wherein the program instructions when executed by the one or more processors further cause the one or more processors to:

detect a change in the second operating parameter as caused by a second ground effect, the second ground effect corresponding to a condition in which an airflow of the second propeller is directed against the surface which increases an effective thrust of the second propeller; and wherein the determination that the proximity of the first propeller to the surface is different than the proximity of the second propeller to the surface is further based at least in part on the detected change in the second operating parameter.

12. A system, comprising:

an automated aerial vehicle, comprising:

a first propeller;

a second propeller;

a computing system, comprising:

one or more processors; and a memory coupled to the one or more processors and storing program instructions that when executed by the one or more processors cause the one or more processors to at least:

determine a proximity to a first surface portion based at least in part on a level of a first parameter that is related to the operation of the first propeller of the automated aerial vehicle, wherein a first ground effect that influences the airflow of the first propeller also influences the first parameter, the first ground effect corresponding to a condition in which the airflow of the first propeller is directed against the first surface portion which increases an effective thrust of the first propeller; and determine a proximity to a second surface portion based at least in part on a level of a second parameter that is related to the operation of the second propeller of the automated aerial vehicle, wherein a second ground effect that influences the airflow of the second propeller also influences the second parameter, the second ground effect corresponding to a condition in which the airflow of the second propeller is directed against the second surface portion which increases an effective thrust of the second propeller.

13. The system of claim 12, wherein the program instructions when executed by the one or more processors further cause the one or more processors to determine a profile of a surface that includes the first and second surface portions based at least in part on the determined proximities to the first and second surface portions.

14. The system of claim 13, wherein the profile of the surface is determined to be at least one of sloped or uneven based at least in part on a difference between the determined proximities to the first and second surface portions.

15. The system of claim 13, wherein the program instructions when executed by the one or more processors further cause the one or more processors to:

determine a proximity to a third surface portion based at least in part on a level of a third parameter that is related to the operation of a third propeller of the automated aerial vehicle, wherein a third ground effect that influences the airflow of the third propeller also influences the third parameter, the third ground effect corresponding to a condition in which the airflow of the third propeller is directed against the third surface portion which increases an effective thrust of the third propeller; and wherein the profile of the surface is also determined based at least in part on the determined proximity to the third surface portion.

16. The system of claim 13, wherein the program instructions when executed by the one or more processors further cause the one or more processors to identify a current location of the automated aerial vehicle as corresponding to a known location based at least in part on a determination that the profile of the surface corresponds to a known profile at the known location.

17. The system of claim 12, wherein the program instructions when executed by the one or more processors further cause the one or more processors to:

determine that the automated aerial vehicle is in danger of colliding with a surface that includes the first and second surface portions based at least in part on the determined proximities to the first and second surface portions; and based on the determination that the automated aerial vehicle is in danger of colliding with the surface, control the first and second propellers to perform an evasive aerial maneuver to prevent the automated aerial vehicle from colliding with the surface.

18. The system of claim 12, wherein the program instructions when executed by the one or more processors further cause the one or more processors to compare the determined proximities to expected proximities during at least one of a landing process, a takeoff process or a flying process.

19. The system of claim 12, wherein the program instructions when executed by the one or more processors further cause the one or more processors to determine that there is an issue with a sensor system of the automated aerial vehicle based at least in part on the sensor system indicating at least one of:

a distance to the first surface portion that is different than the determined proximity to the first surface portion; or a distance to the second surface portion that is different than the determined proximity to the second surface portion.

20. The system of claim 12, wherein the program instructions when executed by the one or more processors further cause the one or more processors to utilize at least one of machine learning or modeling to determine levels of the parameters that correspond to proximities to surface portions.

* * * * *